United States Patent [19]
Bellis, Jr.

[11] Patent Number: 5,647,489
[45] Date of Patent: Jul. 15, 1997

[54] RACK WITH SLIDING MECHANISM FOR RETAINING TUBULAR MEMBERS

[75] Inventor: William B. Bellis, Jr., Louisville, Ky.

[73] Assignee: Trimmer Trap, Inc., Louisville, Ky.

[21] Appl. No.: 485,309

[22] Filed: Jun. 7, 1995

[51] Int. Cl.$^6$ .................................................. A47F 5/00
[52] U.S. Cl. ........................ 211/70.6; 211/4; 211/208; 224/403
[58] Field of Search ........................... 211/70.6, 60.1, 211/207, 208, 4; 224/488, 315, 545, 403, 405, 451, 548; 248/423, 408, 409

[56] References Cited

U.S. PATENT DOCUMENTS

| | | | |
|---|---|---|---|
| 867,996 | 10/1907 | McMillan | 211/4 X |
| 961,234 | 6/1910 | Hoover | 211/60.1 X |
| 2,041,749 | 5/1936 | Fischer | 211/70.6 X |
| 2,865,430 | 12/1958 | Folkner | 248/408 X |
| 3,432,133 | 3/1969 | Schmid . | |
| 3,438,506 | 4/1969 | Groth | 211/4 |
| 3,876,076 | 4/1975 | Hazelhurst | 211/4 |
| 3,893,568 | 7/1975 | Lile . | |
| 3,964,603 | 6/1976 | Sandler | 211/4 X |
| 3,980,217 | 9/1976 | Yochum . | |
| 4,009,853 | 2/1977 | Lile . | |
| 4,027,798 | 6/1977 | Swaim | 211/4 |
| 4,596,334 | 6/1986 | Daulton . | |
| 4,696,405 | 9/1987 | Waring | 211/4 |
| 4,805,781 | 2/1989 | Tegel | 211/4 X |
| 4,923,103 | 5/1990 | Sauber . | |
| 5,287,972 | 2/1994 | Saathoff | 211/4 X |
| 5,361,611 | 11/1994 | Hisler . | |
| 5,372,287 | 12/1994 | Deguevara . | |

FOREIGN PATENT DOCUMENTS 681952 6/1993 Switzerland .................. 211/4

*Primary Examiner*—Robert W. Gibson, Jr.
*Attorney, Agent, or Firm*—Wheat, Camoriano, Smith & Beres, PLC

[57] ABSTRACT

A rack includes a sliding latch member, which operates with one hand and which opens and closes several positions on the rack. The rack holds tubular members such as string trimmers and includes first and second uprights, each of which includes hooks and retaining members for retaining the tubular members on the hooks.

11 Claims, 5 Drawing Sheets

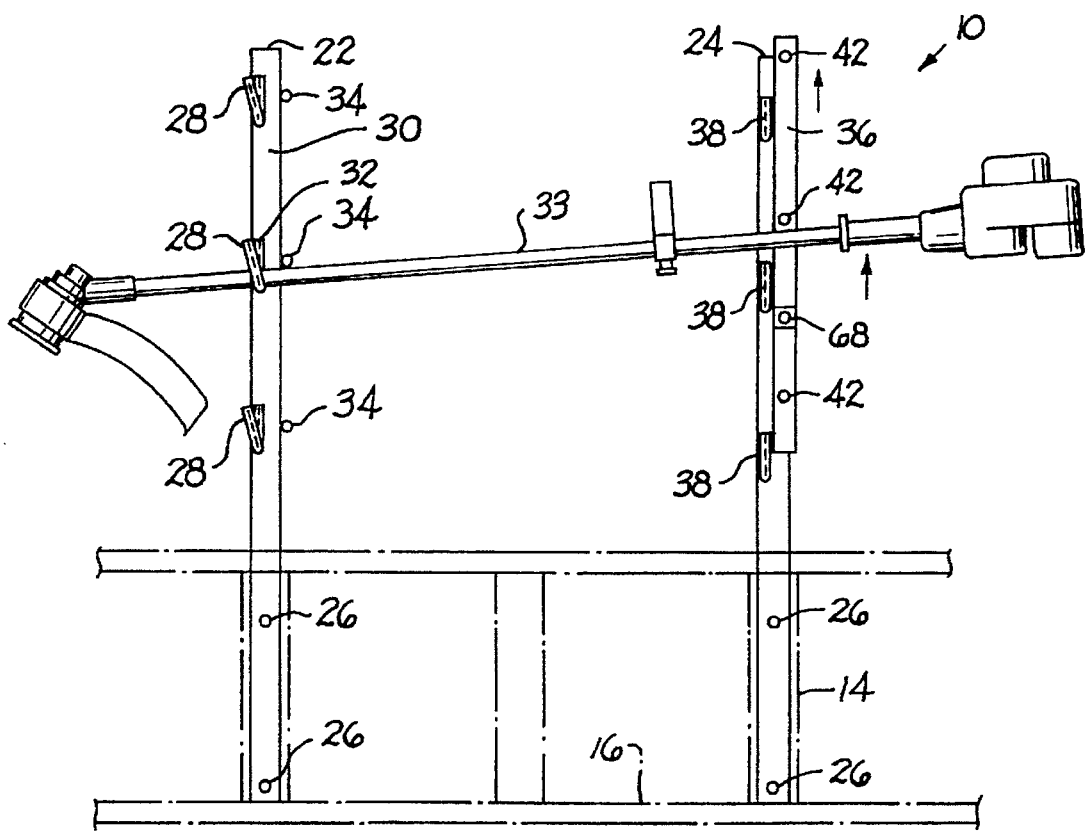
FIG. 3
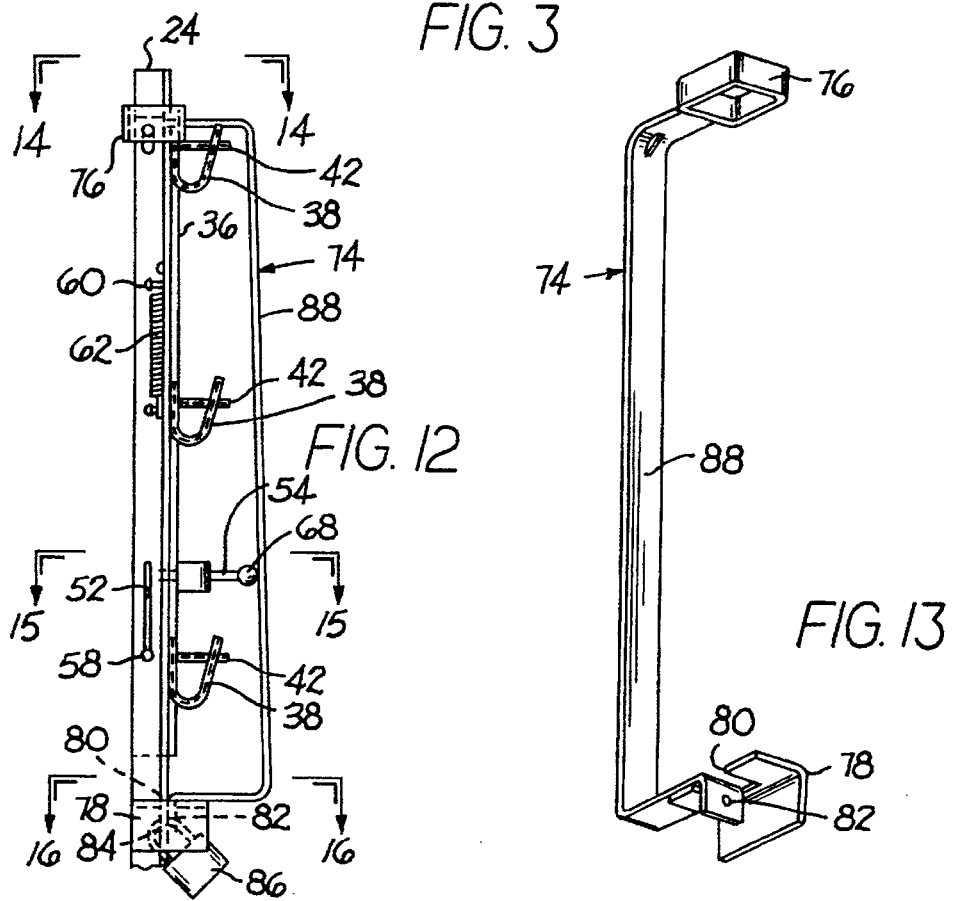
FIG. 12
FIG. 13

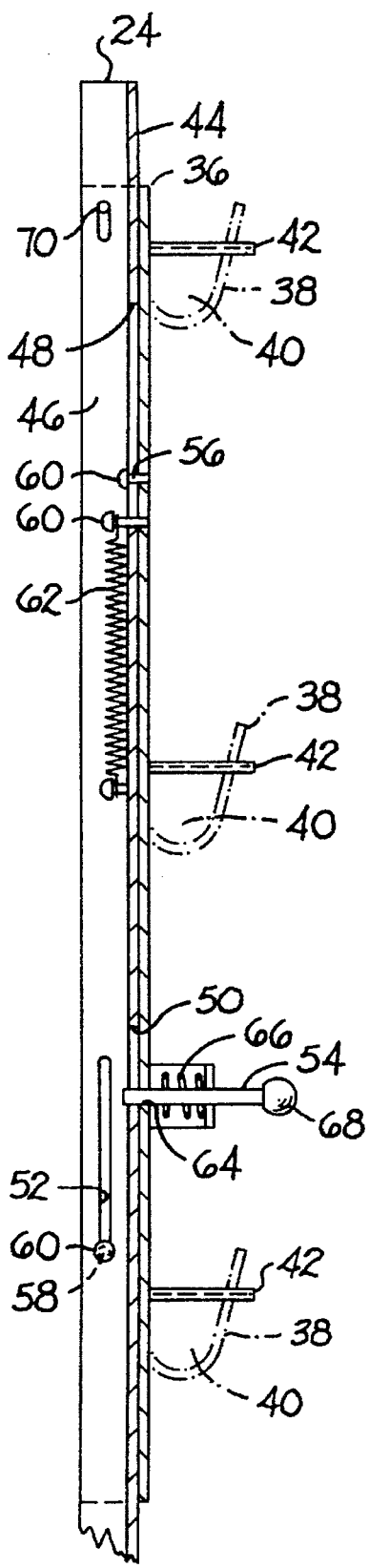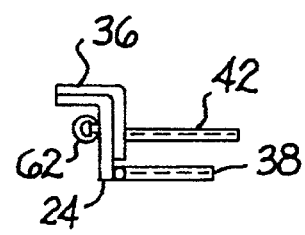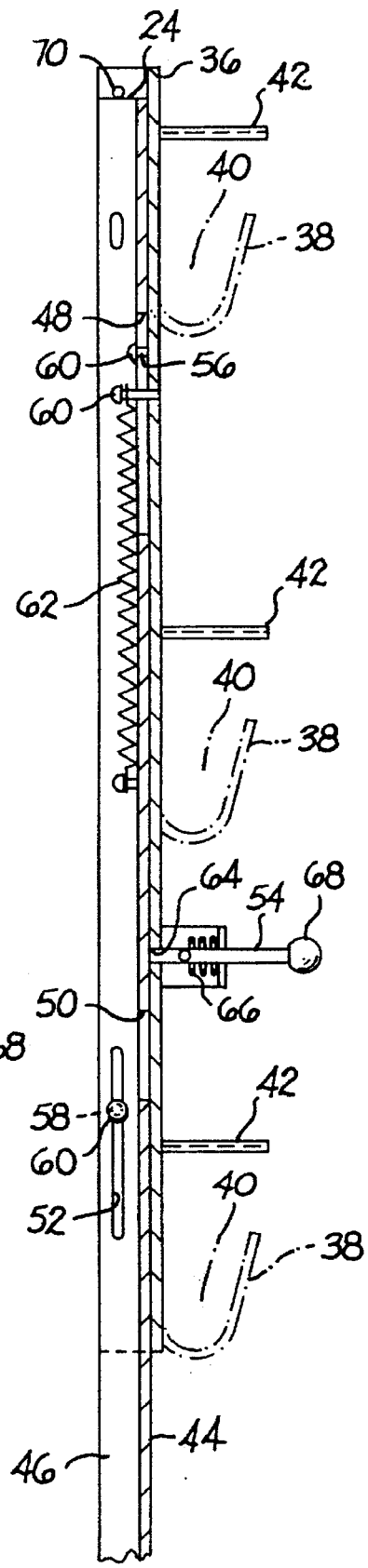
FIG. 7　　　　FIG. 8　　　　FIG. 9　　　　FIG. 10

5,647,489

RACK WITH SLIDING MECHANISM FOR RETAINING TUBULAR MEMBERS

BACKGROUND OF THE INVENTION

The present invention relates to racks, and, in particular, to racks which can support string trimmers or other elongated members.

String trimmers are an important tool for the lawn maintenance business. Lawn mowers, trimmers, and other tools are typically carried from one site to another on a trailer. Securing the string trimmers on the trailer has been a problem in the past. The trimmers have tended to slide and roll around on the trailer in transit, which damages the trimmers. Also, if the trimmers are not secured to the trailer, they may be stolen when the trailer is parked. Since professional trimmers are expensive, this is a problem.

In the prior art, other mechanisms have been used to secure the trimmers to the trailer. However, they have been difficult to use and have not been particularly useful.

SUMMARY OF THE INVENTION

The present invention provides a rack for receiving an elongated, tubular member, such as a string trimmer, in which a plurality of trimmers can be released from the rack with a simple, one-hand motion.

The present invention provides a rack in which the trimmers are automatically secured on the rack whenever there is no external force on the rack.

The present invention provides a rack which can receive and retain tubular members of varying diameters at the same time.

The present invention provides a rack which grips the tubular members so they do not slide or roll when they are retained on the rack.

BRIEF DESCRIPTION OF THE DRAWINGS

FIG. 3 is the same view as FIG. 2, but showing a string trimmer being removed from the rack;

FIG. 7 is a left side sectional view of the right upright member of the rack of FIG. 1;

FIG. 8 is a top sectional view of the latch mechanism on the right upright of FIG. 5;

FIG. 9 is a top view of the right upright of FIG. 5;

FIG. 10 is the same view as FIG. 7 but with the latching mechanism open and the slide mechanism slid upwardly for inserting or removing something from the rack;

FIG. 12 is a left side view of the right upright of FIG. 5 with a security bar added;

FIG. 13 is a rear perspective view of the security bar of FIG. 12;

DESCRIPTION OF THE PREFERRED EMBODIMENT

Figure 1:
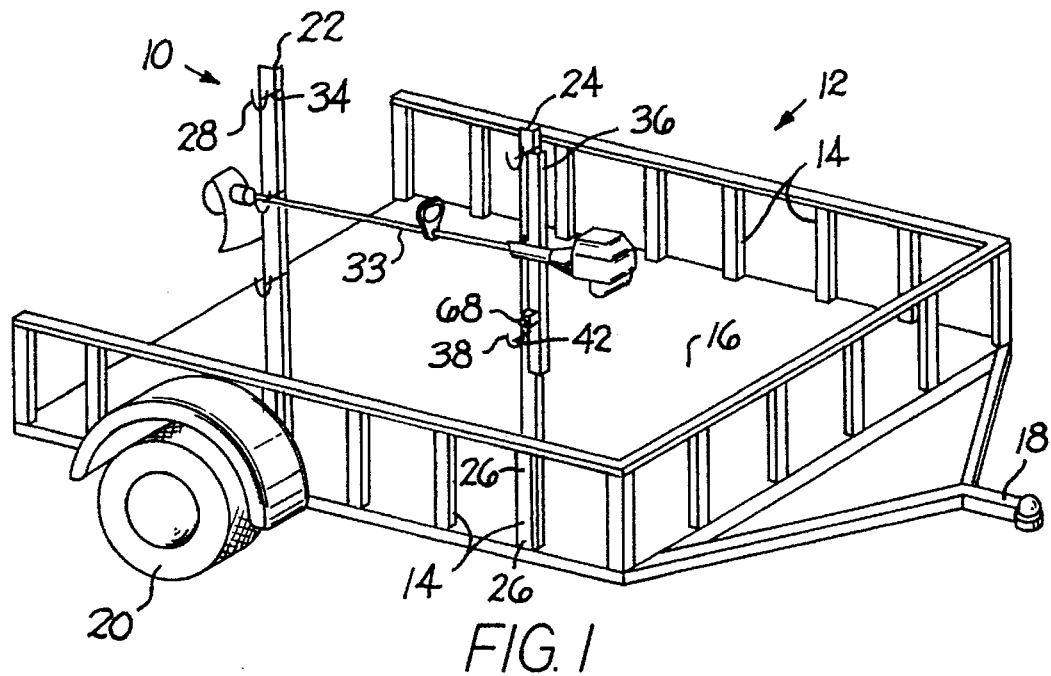
FIG. 1 is a perspective view of a trailer with a preferred embodiment of the rack of the present invention mounted on the trailer.
Figure 2:
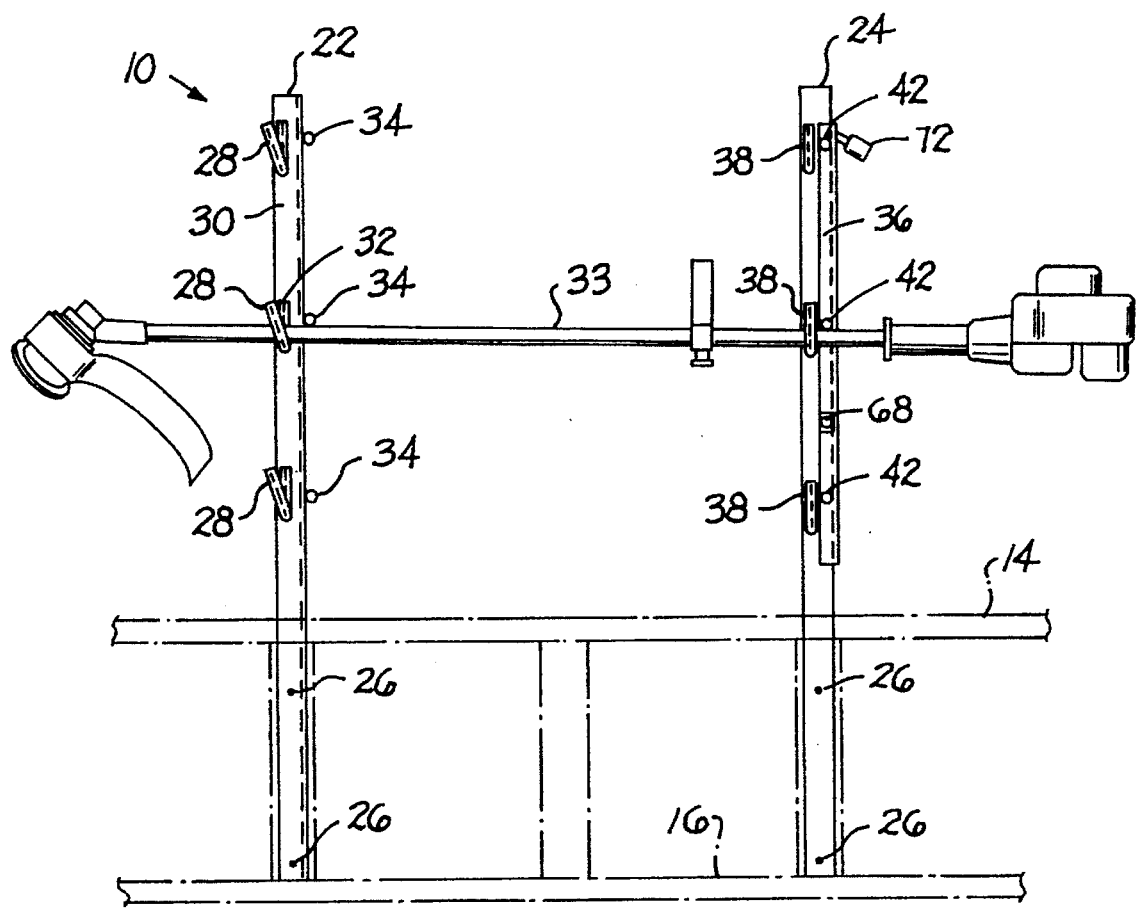
FIG. 2 is a front view of the rack of FIG. 1, with part of the trailer shown in phantom.

Referring first to FIGS. 1-3, there is shown a preferred embodiment of a rack 10, which is mounted on a trailer 12. The trailer 12 includes walls 14, a floor 16, a tongue 18, and wheels 20. The rack 10 is made up of left and right upright members 22, 24, respectively. While the left and right upright members 22, 24 as shown here are separate members, they could instead be part of a single, connected unit. The left and right upright members 22, 24 are preferably mounted to the trailer 12 by standing the uprights 22, 24 on the floor 16 of the trailer 12 and bolting them to one of the walls 14 of the trailer 12 by means of bolts extending through holes 26. Each upright 22, 24 is bolted to the trailer 12 in at least two places, so the rack is solidly mounted on the trailer 12.

Figure 4:
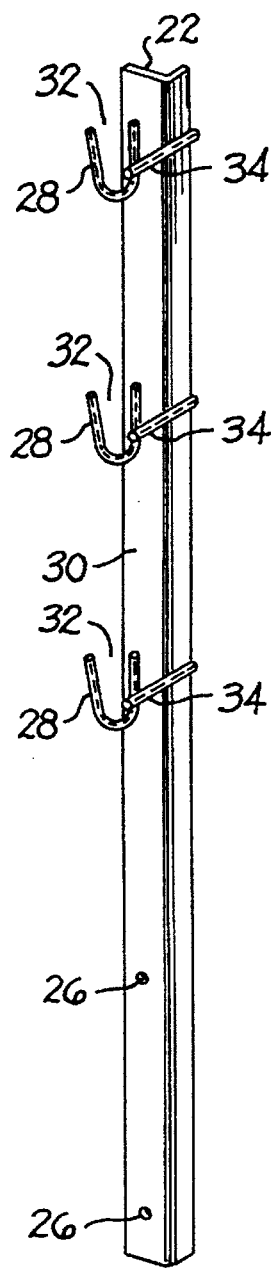
FIG. 4 is a front perspective view of the left upright member of the rack of FIG. 1.
Figure 11:
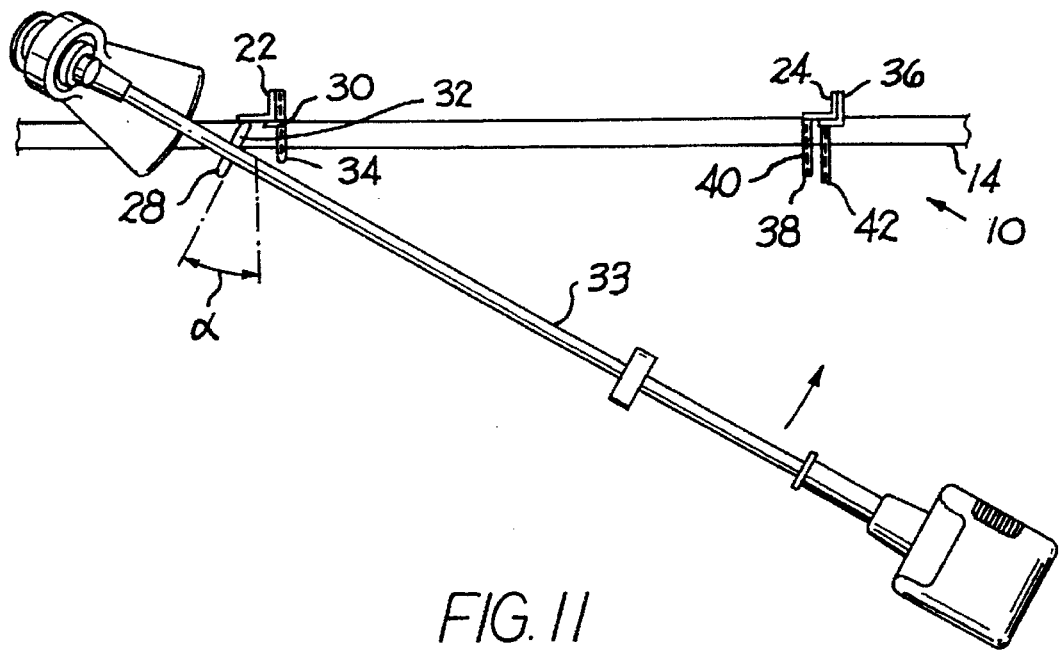
FIG. 11 is a top view of a string trimmer being put onto the rack of FIG. 1.
Figure 14:
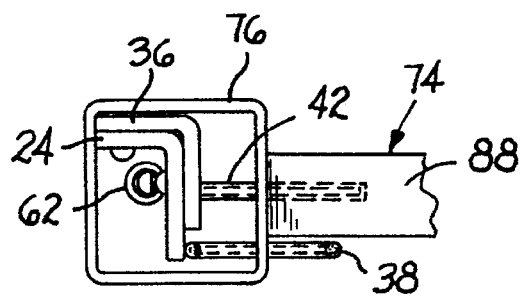
FIG. 14 is a view taken along the section 14—14 of FIG. 12.
Figure 16:
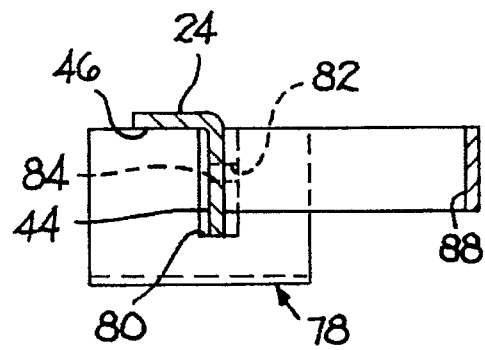
FIG. 16 is a view taken along the section 16—16 of FIG. 12.
Figure 15:
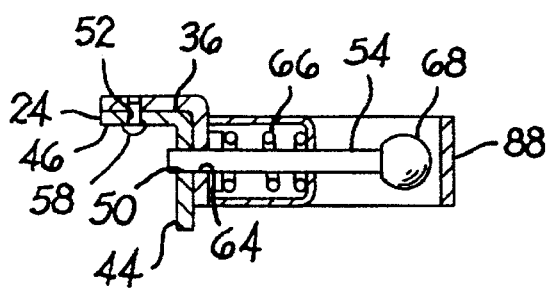
FIG. 15 is a view taken along the section 15—15 of FIG. 12.

Now, looking at all the figures to see the details of the rack, the left upright member 22 (shown in detail in FIG. 4) has three first support hooks 28 mounted on its front face 30. Straight out from the front face 30 is the forward direction. The first support hooks 28 extend at an angle alpha of approximately 45 degrees to the forward direction, as shown in FIG. 11. Each of the first support hooks 28 is substantially U-shaped and defines a top opening 32 for receiving the shaft of a string trimmer. Adjacent each of the first support hooks 28 is a retaining member 34. Each retaining member 34 is preferably welded to the side of the left upright 22 and projects forward from the front of the left upright 22 at a height near the top of its respective first support hook 28. The entire left upright member 22 is stationary relative to the trailer when it is mounted on the trailer.

The right upright member 24 has a sliding latch member 36 mounted on it so as to slide up and down relative to the right upright member 24. The right upright member 24 has three second support hooks 38 mounted on it at the same heights as the corresponding three first support hooks 28 of the left upright member 22. These second support hooks 38 project forward from the right upright 24 and each hook 38 defines a top opening 40 for receiving the handle of a string trimmer 33.

On the sliding latch member 36 are mounted three second retaining members 42. When the sliding latch 36 is down, these second retaining members 42 close off the top opening 40 of their respective second support hooks 38 so that, if the handle of a string trimmer is in a second support hook 38, it cannot be lifted up to be removed.

Both of the upright members 22, 24 are preferably made of flat steel or some other rigid material. The sliding latch 36 is also preferably made of angle iron and wraps around the outside of the right upright member 24.

Figure 6:
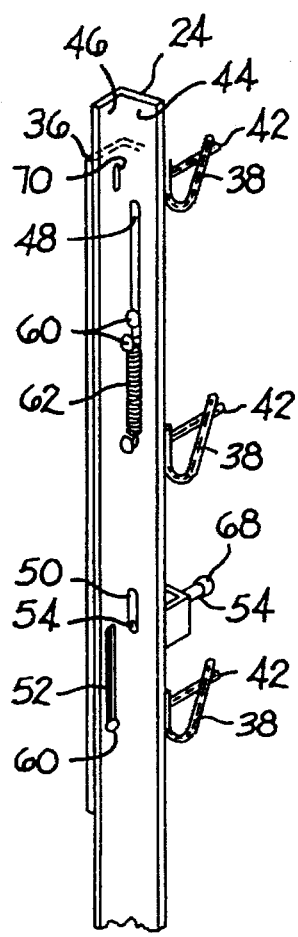
FIG. 6 is a broken-away back perspective view of the right upright member of the rack of FIG. 1.

The manner in which the sliding latch 36 is mounted on the right upright member 24 is shown in FIGS. 5-10. Each of the pieces of angle iron has an L-shaped cross-section, with a front face and a side face. The sliding latch 36 is mounted to both the front and side faces 44, 46 of the right upright member 24. As shown in FIG. 6, there are two vertical slots 48, 50 in the front face 44 of the right upright member, and there is one vertical slot 52 in the side face 46 of the right upright member. The lengths of the vertical slots 48 and 52 are equal, because they both represent the length of travel of the sliding latch member 36 relative to the right upright 24. The shorter slot 50 in the front face 44 receives the latch pin 54, which retains the sliding latch member 36 in the closed position.

The sliding latch member 36 has rivets 56, 58 which extend through their respective slots 48, 52. The rivets 56, 58 have heads 60 which are wider than the slots 48, 52 in order to retain the sliding latch member 36 on the right upright 24. The rivets 56, 58 are positioned so that they bottom out and top out in their respective slots at the same time. There is a spring 62 which is mounted at its upper end to the rivet 56 and at its lower end to the right upright member 24. In order to open the latch, the sliding latch member 36 must be lifted up against gravity and against the force of the spring 62, and, when the sliding latch member 36 is released, the spring and gravity cause the sliding latch 36 to slide downwardly to close the latch.

The latch pin 54 is mounted on the sliding latch member 36 opposite a hole 64 in the front face of the sliding latch member 36. A spring 66 urges the latch pin 54 to extend through the hole 64. When the sliding latch member 36 is down, in the closed position, the latch pin 54 extends through both the hole 64 in the sliding latch member 36 and through the short slot 50 in the front face of the right elongated member 24, so as to latch the sliding latch member in the closed position.

In order to open the sliding latch member, a person need only pull on the round head or handle 68 of the latch pin 54, pulling against the spring 66 until the latch pin is pulled out of the slot 50, then lifting on the round head 68 to lift the sliding latch member upwardly, so the second retaining members 42 move upwardly, away from their respective second support hooks 38. Then, with the other hand, the person can lift the right end of a string trimmer out of its second support hook 38, pivot the trimmer to an angle of about 45 degrees, as shown in FIG. 11, and then lift the left end of the trimmer out of the first support hook 28. As soon as the round head 68 of the latch pin 54 is released, the latch will close, locking any remaining trimmers in place on the rack.

Inserting a trimmer on the rack is simply the reverse of the removal described above. To insert a trimmer on the rack, the left end of the trimmer is inserted vertically into one of the first support hooks 28 on the left upright 22, with the shaft of the trimmer at an angle of about 45 degrees from its normal resting position on the rack. This angle enables the shaft of the trimmer to get by the respective first retaining member 34 in order to enter the top opening of the first support hook 28. Then, the right end of the trimmer is pivoted toward the right upright 24, the latch 36 is slid upwardly, the trimmer is inserted into the respective second support hook 38, the latch is released, and the latch automatically closes, retaining the trimmer on the rack.

While the drawings show only a single string trimmer on the rack 10, it is clear that this rack is made to hold three string trimmers, and it could readily be modified to hold a different number of trimmers by adding or removing support hooks and retaining members. Each of the support hooks 28, 38, and each of the retaining members 34, 42 has a clear plastic tubing slipped over it. This plastic tubing cushions the shaft and handle of the string trimmer to prevent the trimmer from sliding relative to the hooks. It also provides some "give", to enable the rack to securely hold trimmers of different shaft sizes.

Figure 5:
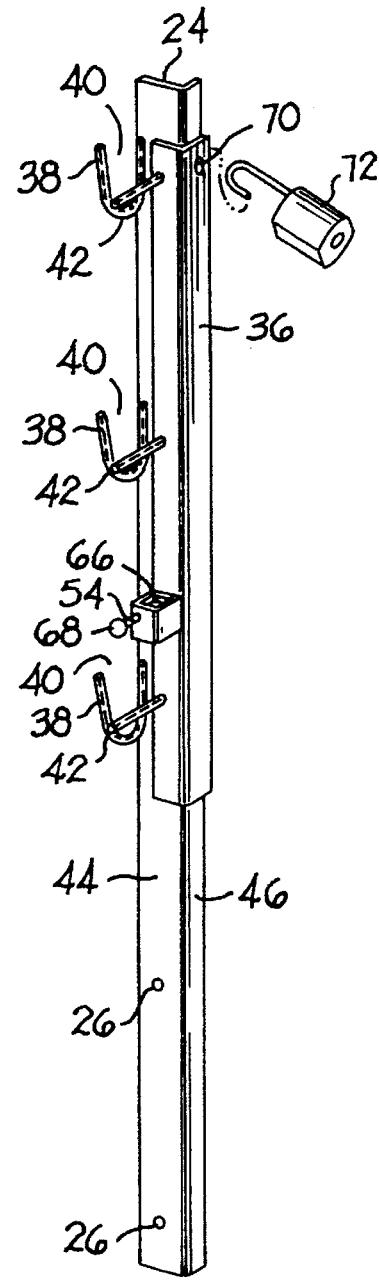
FIG. 5 is a front perspective view of the right upright member of the rack of FIG. 1.

In order to secure the string trimmers against theft, there are two ways of locking the sliding lock 36 in the closed position. First, as shown in FIGS. 5 and 6, aligned holes 70 are located in the sliding latch member 36 and in the right upright 24. The hole 70 in the right upright 24 is slightly elongated, in order to accommodate different handle sizes. A padlock 72 can be inserted through the aligned holes 70 to lock the sliding latch member 36 in the closed position. In this way, the three (or more) string trimmers mounted on the rack 10 can all be secured with a single lock.

A second mechanism for locking the rack 10 is shown in FIGS. 12–16, in which a security bar 74 is added to the right upright 24. The security bar 74 includes a hollow rectangular top portion 76, which surrounds the top of the right upright 24 and sliding latch 36, contacting the top of the uppermost second retaining member 42. It includes a bottom portion 78, which has a slot 80 that enables the bottom portion 78 to wrap around the front face 44 of the right upright 24. The bottom portion has a hole 82 which is aligned with a hole 84 in the right upright 24, and these two aligned holes receive a padlock 86. The security bar 74 also includes an elongated portion 88 which connects together the top portion 76 and the bottom portion 78. When the security bar 74 is installed on the right upright member 24, the elongated portion 88 lies directly in front of the head 68 of the latch pin 54, preventing the latch pin 54 from being pulled out to open the latch.

When the security bar 74 is in place, it prevents the sliding latch member 36 from being lifted up in two ways. First, it prevents the latch pin 54 from moving forward far enough to release the sliding latch 36. Second, the top portion 76 of the security bar 74 presses down on the uppermost second retaining member 42, so that, even if the latch were released, the sliding latch member 36 could not be slid upwardly to open the latch. In addition to that, the space between the elongated member 88 and the right upright 24 is too small for either end of the string trimmer to fit through, so that, even if the latch were released, the string trimmer still could not be removed from the rack. The padlock 86, being surrounded by portions of the security bar 74, would be very difficult to reach with a hacksaw or bolt cutters.

It will be obvious to those skilled in the art that modifications may be made to the embodiment described above without departing from the present invention.

What is claimed is:

1. A rack for supporting a tubular member, comprising:

first and second upright members;

a plurality of first support hooks projecting from said first upright member;

a plurality of second support hooks projecting from said second upright member, opposite said first support hooks, said second support hooks defining a top opening for receiving a tubular member; and a latch mechanism on said second upright member, said latch mechanism including a sliding latch member mounted on said second upright member so as to slide up and down relative to said second upright member; a plurality of second retaining members projecting from said sliding latch member and spaced such that, when said sliding member is slid downwardly, said second retaining members close the open tops of said second support hooks so as to retain a tubular member on said support hooks, and, when said sliding member is slid upwardly, said second retaining members are spaced vertically away from their respective second support hooks so as to release tubular members supported on said hooks;

and wherein said latch mechanism further comprises a spring-loaded retaining pin mounted on said sliding latch member; a hole in said sliding latch member aligned with said retaining pin; and a slot in said second upright member which is aligned with said retaining pin when said latch mechanism is closed, such that, in the closed position, said spring-loaded retaining pin automatically projects through said hole and slot, in order to keep the latch mechanism in the closed position and such that, in order to lift up the sliding latch member, said spring-loaded retaining pin can be pulled out of said slot and lifted, permitting one-hand operation of said latch mechanism for releasing said plurality of second retaining members.

2. A rack for supporting a tubular member, comprising:

first and second upright members;

a plurality of first support hooks projecting from said first upright member;

a plurality of second support hooks projecting from said second upright member, opposite said first support hooks, said second support hooks defining a top opening for receiving a tubular member; and a latch mechanism on said second upright member, said latch mechanism including a sliding latch member mounted on said second upright member so as to slide up and down relative to said second upright member; a plurality of second retaining members projecting from said sliding latch member and spaced such that, when said sliding member is slid downwardly, said second retaining members close the open tops of said second support hooks so as to retain a tubular member on said support hooks, and, when said sliding member is slid upwardly, said second retaining members are spaced vertically away from their respective second support hooks so as to release tubular members supported on said hooks, and further comprising:

a spring connected to said sliding latch member and to said second upright member so as to bias said sliding latch member in the downward direction so as to close said latch mechanism when there is no external force lifting said sliding latch member up.

3. A rack for supporting a tubular member, comprising:

first and second upright members;

a plurality of first support hooks projecting from said first upright member;

a plurality of second support hooks projecting from said second upright member, opposite said first support hooks, said second support hooks defining a top opening for receiving a tubular member; and a latch mechanism on said second upright member, said latch mechanism including a sliding latch member mounted on said second upright member so as to slide up and down relative to said second upright member; a plurality of second retaining members projecting from said sliding latch member and spaced such that, when said sliding member is slid downwardly, said second retaining members close the open tops of said second support books so as to retain a tubular member on said support hooks, and, when said sliding member is slid upwardly, said second retaining members are spaced vertically away from their respective second support hooks so as to release tubular members supported on said hooks, wherein said first upright defines a forward direction, and wherein said first support hooks extend at an angle to the forward direction and define a top opening for receiving a tubular member; and further comprising a plurality of first retaining members projecting forward from said first upright at approximately the height of the top openings of their respective first support hooks, such that the tubular member can be received in its respective first support hook by extending the tubular member perpendicular to its respective first support hook so as to enter its respective top opening and can then be rotated to lie perpendicular to the forward direction, in which position, it would be retained on its respective first support hook by its respective first retaining member, so that it could not be lifted up, out of said top opening of said first support hook without first being rotated back, perpendicular to its respective first support hook.

4. A rack for receiving and retaining a plurality of tubular members, said rack comprising:

one upright member;

a plurality of hooks projecting forward from said upright member and opening Upwardly, said hooks being vertically-spaced at certain intervals;

a sliding latch member mounted on said upright member such that the movement of said sliding latch member relative to said upright member is limited to vertical motion;

a plurality of forwardly-projecting retaining members mounted on said sliding latch member, said retaining members being vertically-spaced at intervals corresponding to the intervals of said hooks, such that, when said sliding latch member is in a down position, reltive to said upright member, said retaining members close their respective hooks, and, when said sliding latch member is slid upwardly, said retaining members are vertically-spaced above their respective hooks, thereby opening said hooks, and further comprising:

a spring mounted on said upright member and said sliding latch member so as to bias the sliding latch member in the down, closed position.

5. A rack as recited in claim 2, wherein said latch mechanism further comprises: a spring-loaded retaining pin mounted on said sliding latch member; a hole in said sliding latch member aligned with said retaining pin; and a slot in said second upright member which is aligned with said retaining pin when said latch mechanism is closed, such that, in the closed position, said spring-loaded retaining pin automatically projects through said hole and slot, in order to keep the latch mechanism in the closed position and such that, in order to lift up the sliding latch member, said spring-loaded retaining pin can be pulled out of said slot and lifted, permitting one-hand operation of said latch mechanism for releasing said plurality of second retaining members.

6. A rack as recited in claim 1, and further comprising: a resilient coating on said plurality of first and second hooks and on said plurality of second retaining members so as to grip any tubular members received on the rack and so as to accommodate a range of diameters of tubular members.

7. A rack as recited in claim 5, and further comprising padlock-receiving holes in said second upright and in said sliding latch member, said padlock-receiving holes being aligned when said latch mechanism is closed, so as to allow a padlock to be received in said padlock-receiving holes for locking said latch mechanism in the closed position.

8. A rack as recited in claim 4, and further comprising: a handle mounted on said sliding latch member for lifting said sliding latch member with one hand.

9. A rack as recited in claim 8, and further comprising a spring-biased retaining pin projecting from said handle, wherein said sliding latch member defines a first hole opposite said retaining pin, and said upright member defines a second hole, which is aligned with said first hole when said sliding latch member is in the "down" position, such that said retaining pin is biased into a position in which it projects through said first and second holes when said handle is released.

10. A rack as recited in claim 9, and further comprising a third hole in said one upright and a fourth hole in said sliding latch member, said third and fourth holes being aligned so as to receive a padlock when said latch is closed.

11. A rack as recited in claim 10, and further comprising: another upright, including a plurality of other hooks for supporting the other end of a plurality of tubular members when one end of said tubular members is received by said one upright.

* * * * *

REEXAMINATION CERTIFICATE (4233rd)

United States Patent [19]
Bellis, Jr.

[11] B1 5,647,489
[45] Certificate Issued Dec. 12, 2000

[54] RACK WITH SLIDING MECHANISM FOR RETAINING TUBULAR MEMBERS

[75] Inventor: William B. Bellis, Jr., Louisville, Ky.

[73] Assignee: Trimmer Trap, Inc., Louisville, Ky.

Reexamination Request:
No. 90/005,581, Dec. 2, 1999

Reexamination Certificate for:
Patent No.: 5,647,489
Issued: Jul. 15, 1997
Appl. No.: 08/485,309
Filed: Jun. 7, 1995

[51] Int. Cl.[7] ........................................... A47F 5/00
[52] U.S. Cl. ................. 211/70.6; 211/4; 211/208; 224/403; 224/546; 224/569; 224/405; 224/401
[58] Field of Search .................. 211/70.6, 60.1, 211/207, 208, 4; 224/488, 315, 545, 403, 405, 451, 548; 248/423, 408, 409

[56] References Cited

U.S. PATENT DOCUMENTS

| | | |
|---|---|---|
| 475,720 | 5/1892 | Colby . |
| 763,461 | 6/1904 | Burton . |
| 867,996 | 10/1907 | McMillan ................................ 211/4 X |
| 914,563 | 3/1909 | Fowler . |
| 961,234 | 6/1910 | Hoover ................................. 211/60.1 X |
| 1,077,513 | 11/1913 | Eagleson . |
| 1,139,940 | 5/1915 | Westmoreland . |
| 2,041,749 | 5/1936 | Fischer .................................. 211/70.6 |
| 2,865,430 | 12/1958 | Folkner ................................ 248/408 X |
| 2,946,452 | 7/1960 | Caloiero et al. ............................. 211/4 |
| 2,987,192 | 6/1961 | Metzler et al. ............................. 211/4 |
| 3,204,774 | 9/1965 | Barbieri ..................................... 211/4 |
| 3,428,282 | 2/1969 | Pernice . |
| 3,432,133 | 3/1969 | Schmid . |
| 3,438,506 | 4/1969 | Groth ........................................ 211/4 |
| 3,876,076 | 4/1975 | Hazelhurst ................................ 211/4 |
| 3,893,568 | 7/1975 | Lile . |
| 3,964,603 | 6/1976 | Yochum . |
| 4,009,853 | 3/1977 | Lile . |
| 4,027,798 | 6/1977 | Swain ........................................ 211/4 |
| 4,596,334 | 6/1986 | Daulton . |
| 4,696,405 | 9/1987 | Waring ..................................... 211/4 |
| 4,805,781 | 2/1989 | Tegel ..................................... 211/4 X |
| 4,923,103 | 5/1990 | Sauber . |
| 5,287,972 | 2/1994 | Saathoff .................................... 211/4 |
| 5,361,611 | 11/1994 | Hisler . |
| 5,372,287 | 12/1994 | Deguervara . |

FOREIGN PATENT DOCUMENTS

| | | | |
|---|---|---|---|
| 681952 | 6/1993 | Switzerland | ............................. 211/4 |

Primary Examiner—Robert W Gibson

[57] ABSTRACT

A rack includes a sliding latch member, which operates with one hand and which opens and closes several positions on the rack. The rack holds tubular members such as string trimmers and includes first and second uprights, each of which includes hooks and retaining members for retaining the tubular members on the hooks.

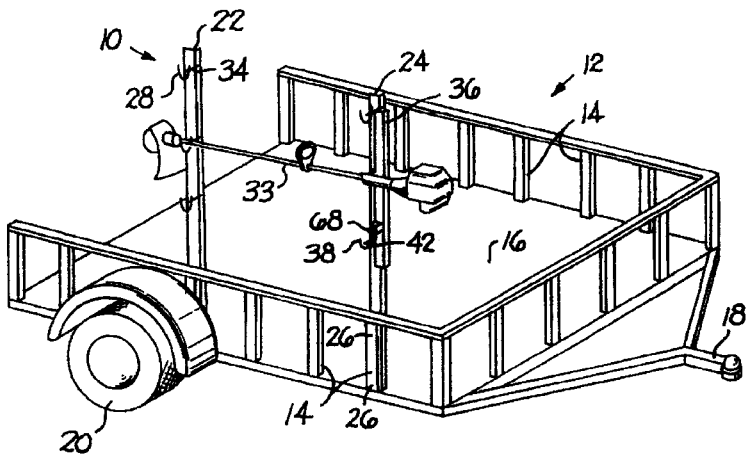
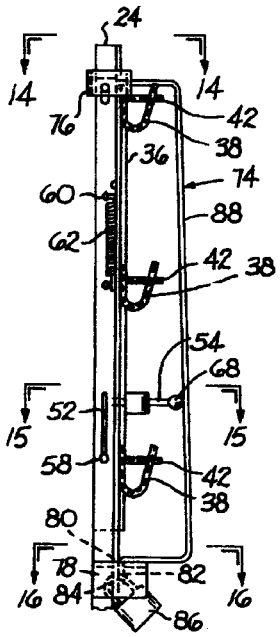

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3, 5–7 and 9–11 is confirmed.

Claim 4 is determined to be patentable as amended.

Claim 8, dependent on an amended claim, is determined to be patentable.

4. A rack for receiving and retaining a plurality of tubular members, said rack comprising:

one upright member;

a plurality of hooks projecting forward from said upright member and opening [Upwardly] *upwardly*, said hooks being vertically-spaced at certain intervals;

a sliding latch member mounted on said upright member such that the movement of said sliding latch member relative to said upright member is limited to vertical motion;

a plurality of forwardly-projecting retaining members mounted on said sliding latch member, said retaining members being vertically-spaced at intervals corresponding to the intervals of said hooks, such that, when said sliding latch member is in a down position, [reltive] *relative* to said upright member, said retaining members close their respective hooks, and, when said sliding latch member is slid upwardly, said retaining members are vertically-spaced above their respective hooks, thereby opening said hooks, and further comprising:

a spring mounted on said upright member and said sliding latch member so as to bias the sliding latch member in the down, closed position.

* * * * *